June 24, 1958     O. TELLER     2,839,857
MULTIPLE FRAME FOR INTERCHANGEABLE PICTURES
Filed June 17, 1957     2 Sheets-Sheet 2
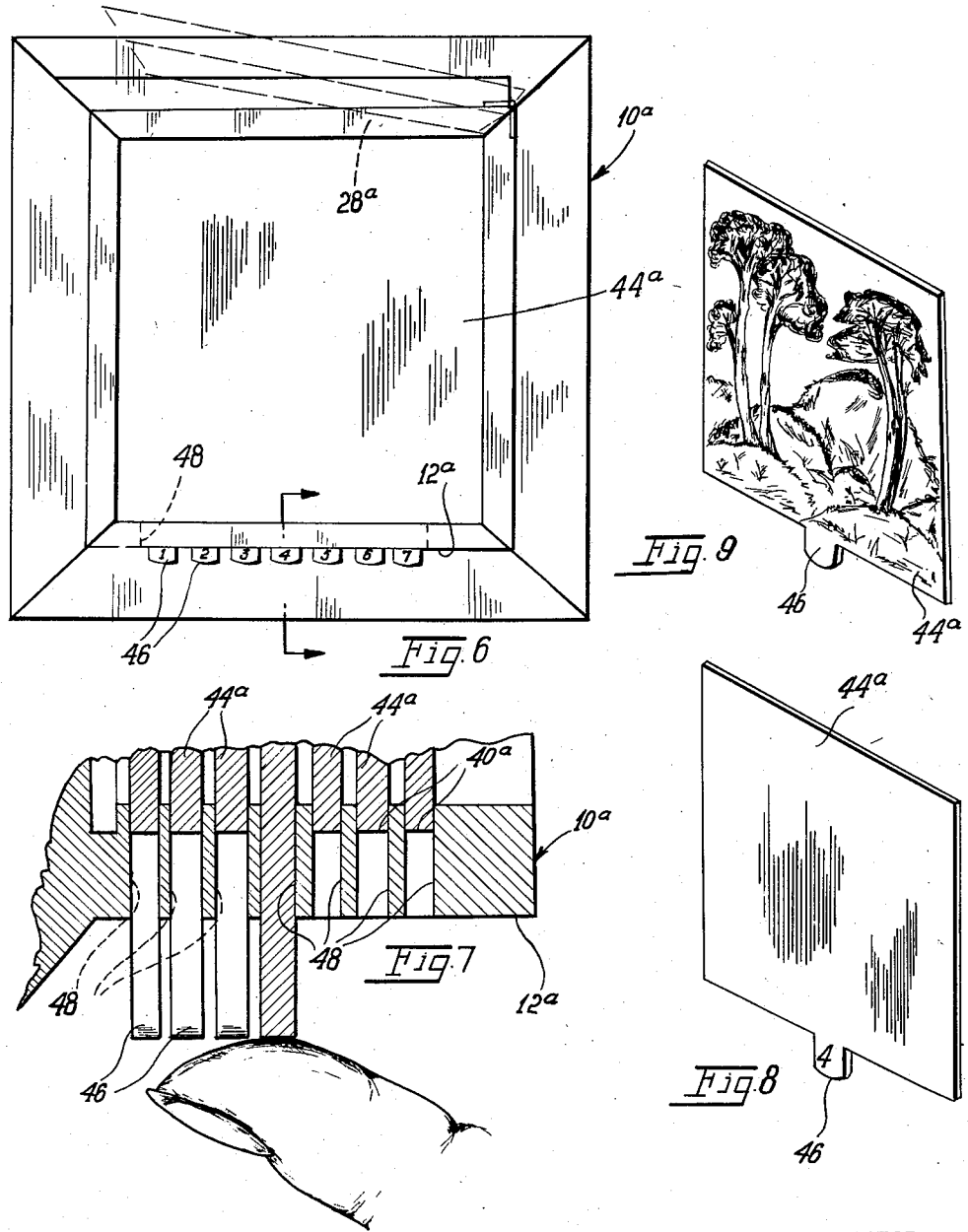
INVENTOR.
Oscar Teller
ATTORNEY

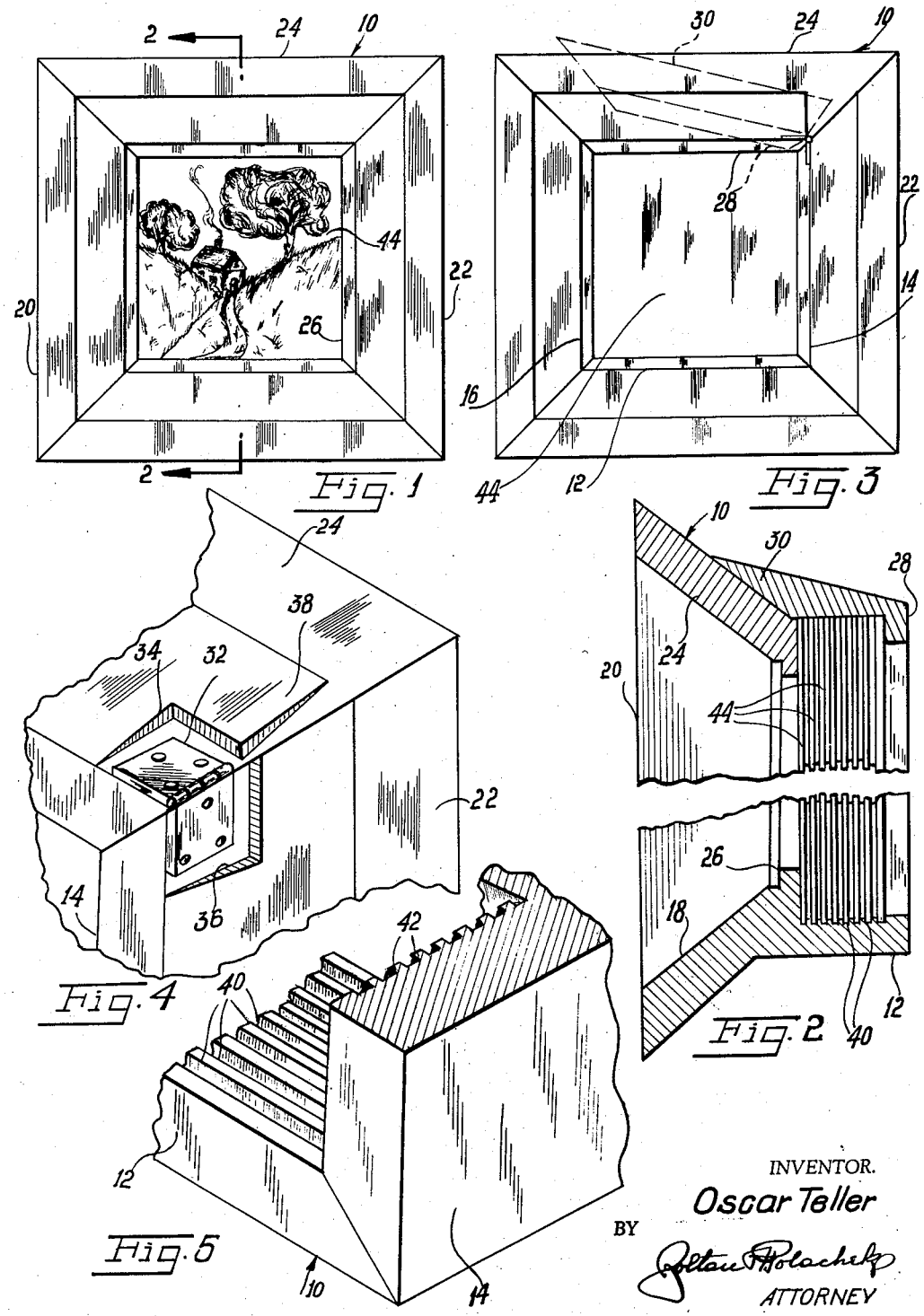

United States Patent Office 2,839,857
Patented June 24, 1958

2,839,857
MULTIPLE FRAME FOR INTERCHANGEABLE PICTURES

Oscar Teller, New York, N. Y.

Application June 17, 1957, Serial No. 666,180

1 Claim. (Cl. 40—64)

This invention relates to picture frames, in general. More particularly, the invention has reference to a frame so designed as to facilitate the interchange of pictures, so that any selected picture can be displayed in the frame. While the invention has particular adaptability in schoolrooms, as a visual teaching aid, the invention of course has general utility and can, for example, be used to advantage in the home, so that one may from time to time change pictures in the same frame with little difficulty and without the frame appearing, to the casual viewer, to have the characteristics of permitting interchange of pictures.

One object of importance is to provide a multiple frame of the type described so designed that all the pictures that are capable of selective display will be stored in the frame, so as to allow any individual picture to be conveniently grasped and used.

Another object is to provide a multiple frame as described in which the interchange of pictures is effected easily and speedily, by movement to open position of a hinged portion of the frame.

Another object is to provide a multiple frame of the character stated that will be so designed that it will occupy little or no more space, upon a wall, than is true of many conventional frames not having the desirable characteristics of the invention.

Still another object is to provide a multiple frame of the character described that will be formed in a manner to assure that each picture will be guided to its stored or displaced position, and will be held out of contact with adjacent pictures, thus to prevent damage or marring of the surface of any picture.

Still another object is to provide a multiple picture frame that will, in at least one form of the invention, include novel means for facilitating the selection of a picture, from a location exteriorly of the frame, said means further being adapted for effecting the partial ejection of the selected picture.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a front elevational view of a multiple frame according to the present invention.

Fig. 2 is an enlarged, vertical section on line 2—2 of Fig. 1, partly broken away.

Fig. 3 is a rear elevational view of the multiple frame on the same scale as Fig. 1, the dotted lines showing a picture-retaining arm in partially open position.

Fig. 4 is a still further enlarged, fragmentary, rear perspective view showing the details of the hinge connection of said arm to the adjacent portion of the frame.

Fig. 5 is an enlarged, fragmentary perspective view of one of the lower corners of the frame showing the means for guiding and spacing the pictures.

Fig. 6 is a rear elevational view of a modified construction including a picture selecting and lifting means.

Fig. 7 in an enlarged sectional view on line 7—7 of Fig. 6, showing an operator's finger in operative position.

Fig. 8 is a rear perspective view of one of the pictures used in the form shown in Figs. 6 and 7.

Fig. 9 is a front perspective view of the picture shown in Fig. 8.

Referring to the drawings in detail, in the form of the invention shown in Figs. 1–5, the frame has been designated at 10, and at its back includes a bottom rail 12 and side rails 14, 16 respectively. Integral with the bottom and saide rails are forwardly projecting front frame portions 18, 20, 22, which flare outwardly in the illustrated embodiment, although, of course, the particular ornamental configuration of the frame can be varied as desired.

There is also provided a top front frame portion 24, also flaring, and the several front frame portions are integral with their rails, the portions being assembled through the use of miter joints as shown or of any other well known means for connecting the parts of a frame together.

Designated at 26 is a rectangular, internal lip extending about the picture-receiving space of the frame.

An upper back rail 28 is hingedly mounted, and is integral with a sloped portion 30 that engages against the back surface of the top frame portion 24.

A hinge 32 is used to connect the rail 28 at one end thereof to the upper end of one of the side rails. As will be noted, the rail 28 is recessed to receive one leaf of the hinge, as at 34, while a similar recess 36 is provided in the side rail 14 to receive the other leaf of the hinge. The sloped portion 30 is cut off squarely at one end, as at 38, to permit the sloped portion of the rail to swing upwardly for the purpose of opening the top of the frame at the back thereof to permit pictures to be inserted or removed.

In the inner surface of the bottom rail 12, there is formed a plurality of closely spaced, narrow, picture-receiving bottom grooves 40, communicating at their ends with corresponding grooves 42 formed in the inner surfaces of the side rails. A picture 44 is insertable in any one of the grooves, through the open top of the frame, when the rail 28 is swung to its open position.

The forwardmost groove, that is, the one adjacent the lip 26, may be used as the groove to receive whatever picture is being displayed at the particular moment. In other words, all but the forwardmost groove would be storage grooves, in which the several pictures are stored. The forwardmost groove, however, is used to receive any picture that is being displayed and would not be used as a storage groove, since the picture in the forwardmost groove would be seen through the front of the frame.

In use of the device as a visual teaching aid, the teacher might desire to employ the device for the purpose of instructing a class in art appreciation, for example. In this way, each of various reproductions of works of art may be displayed in turn in the frame, and would be attractively framed so as to arouse the greatest possible interest so far as the students are concerned. In any event, the device has, of course, many other uses, and can be used to display a series of charts in following order.

In the form of the invention shown in Figs. 6–9, the construction is substantially identical to that already illustrated and described, with the exception that there is provided an identifying and lifting means for the several pictures. In this form, the frame has been generally designated 10ª, and is identical to the frame 10 insofar as the basic shape is concerned, and insofar as the guide grooves, swinging closure, etc., are concerned. Thus, there is a swinging closure arm 28ª, and further, in the bottom and side rails there are provided picture-receiving grooves 40ª. The pictures have been designated 44ª, and are identical in all respects to the pictures of the first form with the exception that they are formed at their lower edges with small, depending, numbered tabs 46.

The pictures are normally supported in the grooves 40ª of the bottom rail 12ª. However, as will be observed, the bottom rail 12ª is provided with a plurality of parallel, narrow slots 48 which extend in length almost the full length of the bottom groove, though terminating at their ends short of the ends of the bottom grooves to insure that the pictures will be properly supported and will not fall downwardly through the slots. The tabs 46 extend downwardly through the slots and project below the rail 12ª with the numbers facing to the back. Thus, the teacher may hold the frame up to the class, and standing in back of the frame may select a particular picture to be displayed, by number. On selection of the particular number, the teacher merely swings the rail 28ª upwardly, and then exerts a light upward pressure on the selected tab with the finger, as shown in the drawing. This causes the selected picture to be shifted upwardly through the open top of the frame to a slight extent, sufficient to permit the top portion of the picture to be grasped after which the picture may be removed in its entirety and placed in the forwardmost, display groove.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

A framed picture comprising a frame bounding a display space in which a picture sheet may be positioned, said frame including a rectangular series of rails one of which is movable to a position providing access to the space for insertion and removal of the sheet; and a plurality of sheets mounted in said space for individual insertion and removal, for disposition of a selected sheet in position to be viewed within the space, said sheets respectively including means projecting therefrom to facilitate identification of the sheets, said identification means comprising tabs projecting outwardly from the several sheets, the several tabs being offset from one another transversely of the frame, the several grooves having slots communicating therewith, said tabs extending through the slots and projecting exteriorly of the frame, whereby on selection of a picture sheet, the tabs thereof may receive pressure from one's finger tending to shift the selected sheet out of registration with adjacent sheets.

References Cited in the file of this patent

UNITED STATES PATENTS

| | | |
|---|---|---|
| 93,120 | Pritchard | July 27, 1869 |
| 634,994 | Neuendorf | Oct. 17, 1899 |
| 946,649 | Woernle | Jan. 18, 1910 |
| 1,068,621 | Abraham | July 29, 1913 |
| 1,668,378 | Pickett | May 1, 1928 |

FOREIGN PATENTS

| | | |
|---|---|---|
| 402,567 | Great Britain | Dec. 7, 1933 |
| 461,045 | Great Britain | Feb. 9, 1937 |